United States Patent
Khadir et al.

(10) Patent No.: US 12,055,471 B2
(45) Date of Patent: Aug. 6, 2024

(54) METHOD AND DEVICE FOR THE OPTICAL CHARACTERIZATION OF PARTICLES

(71) Applicants: Centre National de la Recherche Scientifique, Paris (FR); Université d'Aix-Marseille, Marseilles (FR); CENTRALE MARSEILLE, Marseilles (FR)

(72) Inventors: Samira Khadir, Marseilles (FR); Guillaume Baffou, Plan-de-Cuques (FR); Serge Monneret, Marseilles (FR)

(73) Assignees: Centre national de la recherche scientifique, Paris (FR); Université d'Aix-Marseille, Marseilles (FR); CENTRALE MARSEILLE, Marseilles (FR)

( * ) Notice: Subject to any disclaimer, the term of this patent is extended or adjusted under 35 U.S.C. 154(b) by 274 days.

(21) Appl. No.: 17/753,210

(22) PCT Filed: Aug. 26, 2020

(86) PCT No.: PCT/EP2020/073892
§ 371 (c)(1),
(2) Date: Feb. 23, 2022

(87) PCT Pub. No.: WO2021/037935
PCT Pub. Date: Mar. 4, 2021

(65) Prior Publication Data
US 2022/0283070 A1    Sep. 8, 2022

(30) Foreign Application Priority Data

Aug. 30, 2019 (FR) ........................ 1909592
Aug. 30, 2019 (FR) ........................ 1909601
Nov. 7, 2019 (FR) ........................ 1912525

(51) Int. Cl.
*G01N 15/0227* (2024.01)
*G01N 15/14* (2006.01)
(Continued)

(52) U.S. Cl.
CPC ..... *G01N 15/0227* (2013.01); *G01N 15/1468* (2013.01); *G02B 21/06* (2013.01);
(Continued)

(58) Field of Classification Search
CPC .......... G01N 15/0227; G01N 15/1468; G01N 2015/0053; G01N 2015/1454; G01N 15/0205; G02B 21/06; G02B 21/367
(Continued)

(56) References Cited

U.S. PATENT DOCUMENTS 10,393,643 B2 * 8/2019 Swartzlander, Jr. ........................ G01N 15/1434
2003/0064386 A1   4/2003 Karaki et al.
(Continued)

FOREIGN PATENT DOCUMENTS

FR       3013128 A1   5/2015
WO    2019020975 A1   1/2019

OTHER PUBLICATIONS

A. Arbouet et al. "Direct Measurement of the Single-Metal-Cluster Optical Absorption", Phys. Rev. Lett. (2004), 93, p. 127401. (4 pages).
(Continued)

*Primary Examiner* — Isiaka O Akanbi
(74) *Attorney, Agent, or Firm* — Osha Bergman Watanabe & Burton LLP

(57) ABSTRACT

The present description relates according to a first aspect to a method for measurement of optical properties of at least one particle in a sample (10) and permits, for example, quantitative determination of the complex dipolar polariz-
(Continued)

ability of at least one particle present in a sample. The optical characterization method comprises the illumination of said sample (10) using a light beam, the sample (10) being positioned in the object space of an optical system (120); the acquisition of at least one phase image and at least one intensity image of said at least one particle illuminated by the light beam, the acquisition being carried out in an analysis plane arranged in the image space of the optical system (120); and the determination of at least one optical property of said at least one particle from said at least one phase image and at least one intensity image.

18 Claims, 6 Drawing Sheets

(51) Int. Cl.
 G02B 21/06 (2006.01)
 G02B 21/36 (2006.01)
 G01N 15/00 (2006.01)
 G01N 15/1434 (2024.01)
(52) U.S. Cl.
 CPC ... *G02B 21/367* (2013.01); *G01N 2015/0053* (2013.01); *G01N 2015/1454* (2013.01)
(58) Field of Classification Search
 USPC .................. 356/436, 432, 338, 339, 377
 See application file for complete search history.

(56) References Cited

U.S. PATENT DOCUMENTS

| | | | | |
|---|---|---|---|---|
| 2009/0290156 A1* | 11/2009 | Popescu | ............... | G02B 21/008 359/279 |
| 2009/0325199 A1 | 12/2009 | Geddes | | |
| 2013/0258336 A1* | 10/2013 | Ostermeyer | ....... | G01N 21/8806 356/440 |
| 2015/0043006 A1* | 2/2015 | de Groot | .............. | G01B 9/0209 356/497 |
| 2015/0276589 A1* | 10/2015 | Wagner | .............. | G01N 15/1404 356/440 |
| 2015/0309300 A1* | 10/2015 | Higaki | ................. | G02B 21/367 348/79 |
| 2016/0341946 A1* | 11/2016 | Wenger | ................ | G02B 21/361 |
| 2017/0315039 A1* | 11/2017 | Beil | ................... | G01N 15/0211 |

OTHER PUBLICATIONS

B.J. Davis et al. "Robust determination of the anisotropic polarizability of nanoparticles using coherent confocal microscopy", Journal of the Optical Society of America A (2008), 25, pp. 2102-2113 (12 pages).
P. Van Duyne et al., "Single Silver Nanoparticles as Real-Time Optical Sensors with Zeptomole Sensitivity", Nano Lett. (2003), 3, 8, pp. 1057-1062 (6 pages).
J. Primot et al. "Extended Hartmann Test Based on the Pseudoguiding Property of a Hartmann Mask Completed by a Phase Chessboard", Applied Optics (2000), 39, p. 5715 (6 pages).
S. Khadir et al. "Optical Imaging and Characterization of Graphene and Other 2D Materials Using Quantitative Phase Microscopy", ACS Photonics (2017), 4, p. 3130 (10 pages).
S. Khadir et al. "Quantitative model of the image of a radiating dipole through a microscope", Journal of the Optical Society of America A, 36, (2019), pp. 478-484 (7 pages).
C.L. Holloway et al. "A discussion on the interpretation and characterization of metafilms/metasurfaces: The two-dimensional equivalent of metamaterials", Metamaterials (2009) 3, p. 100 (13 pages).
A. Mendoza-Galván et al. "Optical response of supported gold nanodisks", Optics Express (2011), 19, p. 12093 (15 pages).
R. Ogier et al. "Near-Complete Photo Spin Selectivity in a Metasurface of Anisotropic Plasmonic Antennas", Physical Review X 5 (2015), 5, p. 041019 (8 pages).
G. Lavigne et al. "Susceptibility Derivation and Experimental Demonstration of Refracting Metasurfaces Without Spurious Diffraction", IEEE Transactions on Antennas and Propagation (2018), 66, p. 1321 (8 pages).
International Search Report issued in International Application No. PCT/EP2020/073892, mailed Nov. 17, 2020 (6 pages).
Written Opinion issued in International Application No. PCT/EP2020/073892; Dated Nov. 17, 2020 (6 pages).
European Search Report issued in European Application No. 20771211.8, mailed on Apr. 17, 2024 (9 pages).

\* cited by examiner

METHOD AND DEVICE FOR THE OPTICAL CHARACTERIZATION OF PARTICLES

TECHNICAL FIELD

The present description relates to a method and a device for the optical characterization of particles, and relates in particular to the determination of the complex dipolar optical polarizability of particles and/or the effective absorption, extinction or scattering cross sections.

PRIOR ART

Certain particles, for example metal nanoparticles (NPs), exhibit plasmon resonance effects localized around the visible/infrared range and have been widely studied for applications in nanophotonics, for example the confinement of light or the generation of heat on the nanometer scale for applications in catalysis, biomedicine or biodetection. Recently, alternative materials have been proposed for the particles, whether in plasmonics or for the study of Mie resonances. These materials comprise for example alloys, semiconductor materials, oxides, nitrides and dielectrics.

One major challenge consists in quantifying the optical properties of all these particles, such as their polarizability and/or effective scattering, absorption and extinction cross sections, which are related to the way in which the electrons oscillate in the particles in the presence of light, and in comparing these optical responses with one another. This problem currently remains unresolved, whether for example in plasmonics, nanophotonics, or for the active research and characterization of new materials.

In order to quantitatively estimate the optical properties of a material, or of a particle, e.g. its capacity for example to amplify the near optical field or to generate heat, respectively related to the effective scattering cross section and the effective absorption cross section, it is possible to use analytical models in the case of simple geometries or numerical simulations in the case of complex geometries or environments. However, a particle consisting of a certain material will be modelled by means of its macroscopic optical permittivity, generally measured on thin layers of said material constituting the particle. This approach is found to be effective for the characterization of gold nanoparticles (NPs), but may not be suitable if the particles consist of other materials which exhibit dominant surface effects or exhibit surface oxidations.

Experimentally, the optical characterization of NPs generally consists in measuring an effective extinction cross section, as described for example in the article by A. Arbouet et al. [Ref. 1]. For a complete characterization of the optical properties of particles, however, determination of the effective scattering and absorption cross sections is also sought. These latter two physical quantities are more difficult to access, and the methods proposed for the measurement of each of these physical quantities generally require different systems, which are sometimes complex and often based on approximations (particles that are small compared with the wavelength, for example).

Advantageously, the complex dipolar optical polarizability $\alpha$, defined by the relation:

$$p = \varepsilon_0 \alpha E_0 \quad \text{[Math 1]}$$

(where p is the electrical dipole moment, $\varepsilon_0$ is the permittivity of free space and $E_0$ is the complex amplitude of the electric field of the incident light) is a more fundamental parameter for the characterization of a dipolar particle, from which all the effective cross sections may be determined according to the equations:

$$\sigma_{ext} = \frac{k}{n} \text{Im}(\alpha) \quad \text{[Math 2]}$$

$$\sigma_{sca} = \frac{k^4}{6\pi} |\alpha|^2 \quad \text{[Math 3]}$$

$$\sigma_{abs} = \sigma_{ext} - \sigma_{sca} \quad \text{[Math 4]}$$

where n is the optical index of the environment of the particle, and k is the norm of the wave vector and is expressed according to the equation:

$$k = 2\pi/\lambda_0 \quad \text{[Math 5]}$$

where $\lambda_0$ is the vacuum wavelength of the light.

Thus, the measurement of the complex polarizability can provide all the information relating to the optical properties of a particle. Further, it quantifies not only the amplitude of the oscillation of the electrons in the particle but also the phase of the oscillation, which is an important physical quantity in plasmonics.

Previous works aiming to determine the dipolar polarizability of NPs have been reported. Davis et al. [Ref. 2], for example, have described a method for determination of the anisotropic polarizability by coherent confocal microscopy. This method makes it possible to estimate both the complex polarizability and the position of an NP. However, the described method is complex both in terms of the experimental configuration used and because of the procedure for the extraction of the polarizability. More precisely, the experimental method is based on the use of a confocal microscope and the method for the extraction of the polarizability uses an inversion algorithm in order to optimize the estimation of the polarizability from the measured data.

The present description proposes in particular a method for the complete optical characterization of particles, permitting a quantitative measurement of the complex dipolar polarizability and/or of the effective absorption, scattering and extinction cross sections, without any prior knowledge about the composition of the particles and their geometry, and with an experimental setup which is simpler than those proposed in the prior art.

General Presentation

According to a first aspect, the present description relates to a method for the optical characterization of particles.

The method according to the first aspect of the present description permits, for example, quantitative determination of the complex dipolar optical polarizability of at least one particle present in a sample.

The method according to the first aspect comprises:
- the illumination of said sample using a light beam, the sample being positioned in the object space of an optical system;
- the acquisition of at least one phase image and at least one intensity image of said at least one particle illuminated by the light beam, the acquisition being carried out in an analysis plane arranged in the image space of the optical system;
- the determination of at least one optical property of said at least one particle from said at least one phase image and at least one intensity image, said at least one optical property comprising at least one of the complex dipolar polarizability, the effective absorption cross section, the effective scattering cross section, the effective extinction cross section.

In the present description and in the claims, a "particle" is intended to mean an object which is confined in at least one of the three dimensions of space and at least one of the dimensions of which is contained in the field of view of the optical system. According to one or more exemplary embodiments, the particle is a nanoparticle (NP) or a microparticle. For example, all the dimensions of the particle may lie between 10 nm and 500 nm. According to one or more exemplary embodiments, the particle is of a biological nature (vegetable, animal, prokaryotic, eukaryotic, unicellular, multicellular) or inert nature (metal, dielectric, mineral, semiconducting). For example, the particle may be a living organism such as a bacterium or an inert object such as a metal particle, for example a gold nanoparticle.

According to one or more exemplary embodiments, the particle is a wire, that is to say an object which is confined in only two directions of space. For example, the wire may have a diameter of 100 nm and measure 1 mm in length. According to one or more exemplary embodiments, the method according to the first aspect may be applied to particles which are isolated and/or grouped, in order for example to form an agglomerate or a regular or irregular network of particles.

According to one or more exemplary embodiments, the at least one particle is present in the sample in the form of a suspension or deposited on a substrate, such as a glass slide. According to one or more exemplary embodiments, the sample comprises a plurality of particles, of which some are present in the form of a suspension and others are deposited on a substrate.

A phase image and an intensity image are intended to mean a two-dimensional spatial distribution respectively of the phase and the intensity of the electromagnetic field in said analysis plane.

The phase of the electromagnetic field at a point of the analysis plane is to be understood in the broad sense in the present description, and generally includes any quantity proportional to the path difference (or OPD, for Optical Path Difference) experienced by a ray transmitted or reflected by the sample and incident at said point in the presence of the particle being characterized, in comparison with the case in which the particle is absent. Thus, the phase may refer to a quantity proportional to the local gradient of the optical wavefront.

The Applicants have shown that, by a simple experimental method, it is possible to obtain a quantitative and complete characterization of particles, comprising in particular the determination of an optical property including at least one among the complex polarizability and the three effective cross sections.

In the claims and the description, the "polarizability" is intended to mean the complex dipolar optical polarizability. In the sense of the present description, the determination of the complex dipolar optical polarizability comprises the determination of at least one of the real part, the argument, the norm, or the imaginary part of the complex polarizability of the at least one particle.

According to one or more exemplary embodiments, the polarizability is a scalar defined by Equation (1), and may be a complex number. The measurement of a single scalar for the polarizability may, for example, be suitable for isotropic particles.

According to one or more exemplary embodiments, the particle in question is not isotropic and the method according to the first aspect aims to determine a dipolar optical polarizability tensor. The method according to the first aspect may then comprise the determination of as many scalar measurements as there are components in the tensor. Such components of the polarizability tensor are associated with dimensions of the space in which the polarizability of the particle is considered. According to one or more exemplary embodiments, when considering for example the case of a particle having a polarizability which can be expressed as a tensor having 4 components in an orthogonal reference frame (x,y), the components of the tensor may be measured by the method while varying the orientation of the linear polarization of the light beam to which the sample is illuminated by means of a polarizer (illumination polarizer) and while varying the orientation of a linear polarizer placed between the sample and the image space of the optical system (detection polarizer), for example just upstream of the image space of the optical system. For example, in order to obtain the scalar term $\alpha_{xx}$ (or $\alpha_{yy}$, respectively), the method according to the first aspect comprises the orientation of the two polarizers (illumination and detection) along the same direction x (or y, respectively), and the determination of the polarizability under this condition. In order to obtain the diagonal term $\alpha_{xy}$ (or $\alpha_{yx}$, respectively), the sample is illuminated with light polarized along x (or y, respectively), the detection polarizer is oriented along the other direction y (or x, respectively), and the polarizability is determined under this condition.

According to one or more exemplary embodiments, the method comprises the acquisition of a phase image and an intensity image simultaneously. Such simultaneity may, for example, make it possible to shorten the measurement time of the method according to the first aspect, and may prove practical in the case of particles whose optical properties change with time.

According to one or more exemplary embodiments, the simultaneous acquisition of at least one phase image and at least one intensity image is carried out by multiwave lateral shearing interferometry, for example quadriwave lateral shearing interferometry. Multiwave lateral shearing interferometry permits a quantitative determination of the phase and the intensity with a high resolution and a high sensitivity in a single measurement.

As an alternative, the acquisition of at least one phase image and at least one intensity image may not be simultaneous. For example, such simultaneity is not required in the case in which the optical property of the particle varies little or not at all over time.

According to one or more exemplary embodiments, the acquisition of at least one phase image and at least one intensity image is carried out by "off-axis" holographic (DHM for Digital Holographic Microscopy, Hilbert Phase Microscopy) or "common-path" microscopy (Fourier Phase Microscopy, Diffraction Phase Microscopy), by "phase-shifting interferometry", or by means of a non-interferometric technique based on the transport of intensity equation ("TIE microscopy").

According to one or more exemplary embodiments, the optical system functions in transmission. According to one or more exemplary embodiments, the optical system functions in reflection.

According to one or more exemplary embodiments, the illumination of the sample is at least partially spatially coherent and is obtained from an incoherent light source, for example an LED, a filament lamp, a laser-sustained plasma lamp (LDLS). A device permitting adjustment of the numerical aperture of the illumination may, for example, contribute to varying the degree of spatial coherence of the illumination. According to one or more exemplary embodiments, the illumination comprises Köhler illumination.

According to one or more exemplary embodiments, the determination of the optical property comprises processing carried out on said at least one phase and intensity image.

According to one or more exemplary embodiments, said processing comprises the determination of a normalized transmittance of the sample.

According to one or more exemplary embodiments, said processing comprises the calculation of a combined image from said at least one phase image and said at least one intensity image, said combined image (or "combination image") being obtained from the normalized complex transmission, the real part of the normalized complex transmission or the imaginary part of the normalized complex transmission. The processing then comprises, according to one or more exemplary embodiments, the summation of points (or "pixels") of said combined image in a given field of the combined image comprising an image of said at least one particle. The combination image may comprise Airy patterns corresponding to the detection of as many particles present in the sample.

According to one or more exemplary embodiments, the summation of the pixels is carried out over a restricted zone of the combination image, comprising for example an Airy pattern corresponding to an image of a particle, for example a minimum zone making it possible to cover all the diffraction rings of the Airy pattern.

If all the diffraction rings of the Airy pattern are contained in the zone of the combination image over which the summation of the pixels is carried out, the method may offer precise determination of the at least one optical property. When the summation is carried out over a zone containing a plurality of Airy patterns, corresponding to as many particles, said particles may together be considered as a multiple system. The method makes it possible to determine the polarizability and the effective cross sections of such a multiple system because the polarizability and the effective cross sections are additive.

According to one or more exemplary embodiments, the method further comprises the variation of the numerical aperture of said optical system and the acquisition of a plurality of intensity images and/or phase images at the different numerical apertures. For example, the optical system may comprise an iris, the rotation of which makes it possible to vary the numerical aperture of the optical system. Acquiring intensity and phase images at different numerical apertures and averaging them makes it possible to reduce the spatial extent of the diffraction rings of an Airy pattern, and therefore to integrate a less extended zone of the image (e.g. by carrying out summation of the pixels of the image) comprising the Airy pattern, and thus to gain in signal-to-noise ratio. This may, for example, make it possible to study particles which are very close to one another and have Airy rings which would overlap without such averaging. Further, when a combination image is produced from acquisition of a phase image and acquisition of an intensity image, a gain of $\sqrt{N}$ may be obtained in the signal-to-noise ratio, where N is the number of combination images produced at the different numerical apertures.

According to one or more exemplary embodiments, the analysis plane is optically conjugate with the sample plane. Defocusing, that is to say measurement in a plane which differs from the plane conjugate with the sample plane, does not however affect the accuracy of the measurement because the Applicants have demonstrated that the measured value of the optical properties, such as the polarizability a and the effective cross sections, is independent of the focusing.

In the present description, a focusing change is synonymous with defocusing in relation to a configuration in which a plane of the sample containing the particle and the analysis plane are optically conjugate. Thus, different focusings correspond for example to different positions of said plane of the sample in relation to a reference position which is optically conjugate with the analysis plane. Alternatively, different focusings may correspond to different positions of the analysis plane in relation to a reference position which is optically conjugate with the plane of the sample comprising the particle.

According to one or more exemplary embodiments, the method further comprises the acquisition of a plurality of intensity images and/or phase images for a plurality of focusings of the optical system. For example, when the optical system comprises a microscope objective, the focusing may be modified by changing the distance between the sample and the objective of the microscope toward out-of-focus distances. Acquiring intensity and phase images for different focusings and averaging them makes it possible to reduce the spatial extent of the diffraction rings of an Airy pattern, and therefore to integrate a less extended zone of the image (e.g. by carrying out summation of the pixels of the image) comprising the Airy pattern, and thus to gain in signal-to-noise ratio. This may, for example, make it possible to study particles which are very close to one another and have Airy rings which would overlap without such averaging. For example, when a combination image is produced from acquisition of a phase image and acquisition of an intensity image, a gain of $\sqrt{N}$ may be obtained in the signal-to-noise ratio, where N is the number of combination images produced at the different focusings.

According to a second aspect, the present description relates to a device for the optical characterization of at least one particle present in a sample, comprising:
  a light source for the formation of a beam for illumination of said sample;
  an optical system, the sample being positioned during operation in the object space of said optical system;
  a unit for acquisition of at least one phase image and at least one intensity image of said at least one particle illuminated by the light beam, the acquisition being carried out in an analysis plane arranged in the image space of the optical system;
  a calculation unit configured for the determination of at least one optical property of said at least one particle from said at least one phase image and at least one intensity image, said at least one optical property comprising at least one of the complex dipolar polarizability, the effective absorption cross section, the effective scattering cross section, the effective extinction cross section.

For example, the light source may be a Köhler device. Köhler illumination having an LED or a filament lamp is used to illuminate a sample with a light beam which is controlled in size and numerical aperture. Different colors of LEDs are used to select the illumination wavelength range. Such a wavelength may, as an alternative, be varied by using a white light source and a monochromator.

According to one or more exemplary embodiments, the acquisition unit comprises a multiwave lateral shearing interferometer.

According to one or more exemplary embodiments, the analysis plane is optically conjugate with the plane of the sample, or slightly defocused.

According to one or more exemplary embodiments, the optical system comprises a microscope objective.

According to one or more exemplary embodiments, the optical system makes it possible to vary the numerical aperture of the illumination and said calculation unit is configured for the determination of said at least one optical property from a plurality of phase images and intensity images which are acquired for a plurality of numerical apertures. For example, the optical system may comprise an iris, the rotation of which makes it possible to vary the numerical aperture of the optical system.

According to one or more exemplary embodiments, the optical system makes it possible to vary the focusing and said calculation unit is configured for the determination of said at least one optical property from a plurality of phase images and intensity images which are acquired for a plurality of focusings.

According to a third aspect, the present invention relates to a method for characterization of the interaction of at least one target molecule with a particle. In the field of sensors, for example the field of bio sensors, the development of means permitting the effective and direct capture of a recognition signal of a target molecule, such as a molecule which has a biological interest, constitutes a significant challenge.

The Biacore© system is one example of a commercial system permitting the detection of molecules in solution and the measurement of association/dissociation/affinity constants between molecules. The Biacore© system uses a metal layer on a transparent substrate, and therefore a type of geometry which resonantly absorbs a wave incident at a very specific angle of incidence for a given wavelength. When the molecules of interest become attached to the metal surface, the system measures a variation of this angle of incidence. The Biacore© system is expensive and complex, and makes it necessary to take measurements of different angles in order to obtain a measurement of the wavelength shift of the plasmon resonance, which is related to the adsorption of target molecules on the metal surface.

Current biodetection methods, when they are associated with plasmonics, for example, almost exclusively rely on the detection of spectral shifts and their corresponding intensity changes, as described for example in the article by P. Van Duyne et al. [Ref. 3].

The method for characterization of the interaction of at least one target molecule with a particle comprises:
  optical characterization of said at least one particle in order to determine at least one of said optical properties over time;
  characterization of the interaction with said at least one target molecule on the basis of a measurement of the variation of said at least one optical property over time.

According to one or more exemplary embodiments, the target molecule is selected from among the group consisting of antibodies, antigens, nucleic acids, proteins, carbohydrates, chromophores, aptamers, toxins, pollutants.

According to one or more exemplary embodiments, said at least one optical property comprises at least one of the real part, the argument, the norm, or the imaginary part of the complex polarizability of the at least one particle.

Such a measurement makes it possible to sensitively detect the interaction of target molecules with particles. For example, the measured complex polarizability of a particle may vary very abruptly with the wavelength, for example in a wavelength range centred around the plasmon resonance or the Mie resonance of the particle.

According to one or more exemplary embodiments, the optical characterization of said at least one particle is carried out according to the first aspect and comprises:
  the illumination of said sample using a light beam, the sample being positioned in the object space of an optical system;
  the acquisition of at least one phase image and at least one intensity image of said at least one particle illuminated by the light beam, the acquisition being carried out in an analysis plane arranged in the image space of the optical system;
  the determination of at least one optical property of said at least one particle from said at least one phase image and at least one intensity image, said at least one optical property comprising at least one of the complex dipolar polarizability, the effective absorption cross section, the effective scattering cross section, the effective extinction cross section.

According to one or more exemplary embodiments, the characterization method according to the third aspect comprises a qualitative detection of the interaction. According to one or more exemplary embodiments, the method according to the third aspect further comprises a quantitative measurement of at least one of the following physical quantities:
  a target molecule concentration in the sample,
  an affinity and/or association and/or dissociation constant of a target molecule with the at least one particle or with a molecule attached beforehand to the at least one particle.

Such a molecule may be attached to the particle covalently, e.g. by grafting, or reversibly, e.g. by means of one or more weak interactions such as an electrostatic interaction, a hydrogen bond, a van der Waals interaction. For example, the molecule attached beforehand to the at least one particle is selected from the group consisting of antibodies, antigens, nucleic acids, proteins, carbohydrates, chromophores, aptamers, toxins, pollutants. For example, the molecule attached beforehand to the at least one particle is an antibody, a glycoprotein, or a DNA fragment.

Such physical quantities, i.e. concentration and affinity and/or association and/or dissociation constants, may be measured quantitatively. For example, the target molecule concentration in the sample may be deduced from a measurement of the at least one optical property over time.

An abrupt variation of the at least one optical property of the particle may for example be detected over time, and may correspond to an instant at which the particle enters an interaction with the at least one target molecule, for example to an instant at which at least one target molecule becomes associated with the particle in order to form a "particle"/"target molecule(s)" complex, or the particle becomes dissociated. An abrupt variation of the at least one optical property of the particle over time may also be detected and correspond to an instant at which at least one molecule attached beforehand to the particle enters an interaction with at least one target molecule, for example to an instant at which at least one target molecule becomes associated with the particle in order to form at least one "molecule attached to the particle"/"target molecule(s)" complex.

In the presence of a network of particles, for example, calibration curves may be measured for a target molecule. Such calibration curves may make it possible to ascertain the value of the optical property of the particle which is expected for different target molecule concentrations, and may thus make it possible to access the target molecule concentration in a sample.

Likewise, an association constant or a dissociation constant, describing for example the propensity of a "particle"/"target molecule(s)" complex or a "molecule attached to the particle"/"target molecule(s)" complex to be formed, or respectively to be dissociated, may be measured quantitatively from the target molecule concentration, particle concentration and the concentration of "particle"/"target molecule(s)" complex, or respectively of "molecule attached to the particle"/"target molecule(s)" complex concentration, in the sample. An affinity constant may also be determined, which is equal to the ratio of the association constant to the dissociation constant or equal to the inverse of such a ratio, and thus to give an account of the affinity of the target molecule for the particle or for the molecule attached to the particle. This affinity may in particular depend on the nature, the geometry and the number of physical interactions between the target molecule and the particle or between the target molecule and the molecule attached to the particle (electrostatic interactions, hydrogen bonds, van der Waals interactions . . . ).

According to one or more exemplary embodiments, the at least one particle is a metal particle and comprises at least one plasmon resonance. According to one or more exemplary embodiments, the illumination of the sample comprises illumination in a wavelength range comprising at least one plasmon resonance wavelength of the at least one particle.

According to one or more exemplary embodiments, the at least one particle is a dielectric particle and has at least one Mie resonance. According to one or more exemplary embodiments, the illumination of the sample comprises illumination in a wavelength range comprising at least one Mie resonance wavelength of the at least one particle.

According to one or more exemplary embodiments, the method according to the third aspect further comprises a calibration of the concentration of the at least one target molecule as a function of the variation of the at least one optical property. The determination of the interaction with the at least one target molecule comprises a determination of the concentration of said target molecule in the sample on the basis of the calibration. Such a calibration may, for example, be carried out in the presence of a network of particles. Calibration curves may be measured for a target molecule in the presence of a predetermined type of particle. Such calibration curves may make it possible to ascertain the value of the optical property of the particle which is expected for different target molecule concentrations, and may thus make it possible to access the target molecule concentration in a sample.

According to one or more exemplary embodiments, the method comprises the addition of the at least one target molecule into the sample via a microfluidic circuit. For example, this addition may be carried out by circulating a solution comprising the target molecule in the microfluidic circuit.

According to one or more exemplary embodiments, the at least one particle is attached to a substrate. For example, the particle is attached to a solid substrate. According to one or more exemplary embodiments, the at least one particle is attached to a substrate covalently. In this way, the particle remains fixed and does not float out of focus or out of the field of view. The fact that the particle is attached to the substrate may further make it possible to reuse the particle for subsequent measurements, for example when the association of the target molecule with the particle or with a molecule attached beforehand to the particle is reversible.

According to one or more exemplary embodiments, the method comprises a characterization of the interaction of a plurality of target molecules with a plurality of particles, in which at least two of the plurality of the target molecules are different in nature and/or at least two of the plurality of the particles are different in nature. The method according to the third aspect may thus offer the possibility of multiplexing the detection and/or the quantitative measurements. Thus, according to one or more exemplary embodiments, the method according to the third aspect makes it possible to detect numerous interactions in the sample and/or to quantify different physical quantities intrinsic to the target molecules and to the particles of the sample simultaneously, in parallel. Different zones of the phase image or of the intensity image may be associated with different types of particles. According to one or more exemplary embodiments, the particle is selected for its ability to carry a molecule attached to the particle. Such a molecule attached to the particle, for example an antibody, may be selected for the specificity of its interaction with different target molecules, e.g. certain affinity for a certain type of target molecule. According to one or more exemplary embodiments, the particle is selected for the specificity of its interaction with different target molecules, e.g. a certain affinity of the particle for a certain type of target molecule.

According to a fourth aspect, the present description concerns a device for the characterization of the interaction of at least one target molecule with at least one particle present in a sample, comprising:
  a device for the optical characterization of said at least one particle according to the second aspect, which is configured to determine at least one optical property of said at least one particle over time; and wherein:
  said calculation unit is further configured for characterization of the interaction with said at least one target molecule on the basis of a measurement of the variation of said at least one optical property over time.

According to one or more exemplary embodiments, said at least one optical property comprises at least one of the real part, the argument, the norm, or the imaginary part of the complex polarizability of the at least one particle.

According to one or more exemplary embodiments, said calculation unit is further configured for determining a quantitative measurement of at least one of the following physical quantities:
  a target molecule concentration in the sample,
  an affinity and/or association and/or dissociation constant of a target molecule with the at least one particle or with a molecule attached beforehand to the at least one molecule.

According to one or more exemplary embodiments, the device comprises a microfluidic circuit for adding the at least one target molecule into the sample or having it circulate therein.

The embodiments described above are not exhaustive. In particular, it is to be understood that additional embodiments may be envisioned on the basis of various combinations of the embodiments explicitly described. Unless otherwise indicated to the contrary in the present description, it will be apparent to the person skilled in the art that all the embodiments described above may be combined with one another. For example, unless indicated to the contrary, all the characteristics of the embodiments described above, whatever the embodiments of the method or of the device to which they refer, may be combined or replaced with other characteristics of other embodiments.

DETAILED DESCRIPTION

In the following detailed description of the embodiments of the present invention, numerous specific details are explained in order to provide a more in-depth understanding of the present description. It will, however, be apparent to the person skilled in the art that the present description may be implemented without these specific details. In other cases, well-known characteristics have not been described in detail in order to avoid superfluously complicating the description.

Moreover, the term "comprise" signifies the same thing as "include", "contain", and is inclusive or open and does not exclude other elements which are not described or represented. Further, in the present description, the term "about" is synonymous with (signifies the same thing as) an upper and/or lower margin of 10%, for example 5%, of the respective value.

The present description describes examples of processing intensity and wavefront images (or PIWI) according to the invention of particles under illumination.

In the examples described below, a quantitative phase imaging technique known as multiwave lateral shearing interferometry, and in particular quadriwave lateral shearing interferometry (or QLSI), is used because it permits at the same time high-resolution imaging, a high sensitivity and a quantitative phase measurement. Other imaging techniques may, however, be used in the examples of methods according to the invention.

In a first part, an example of a characterization device according to the present description, in which multiwave lateral shearing interferometry is employed, is described. In a second part, the way in which to use PIWI in order to recover the complex polarizability of simple NPs is explained. In particular, it is shown that the measurements are independent of the focusing and the numerical aperture, and are not affected by the diffraction limit, which makes the measurements particularly robust and precise. In a third part, the results on the gold (spheres and rods) and dielectric NPs are presented and discussed. The measurements are supported by theoretical calculations and numerical simulations. A fourth part is given over to the characterization of dense layers of NPs, for which PIWI image processing also makes it possible to recover an effective complex polarizability. In a fifth part, applications of the methods according to the present description for the optical characterization of particles are described.

For example, methods for characterization of the interaction between a target molecule and a particle are described.

Figure 1:
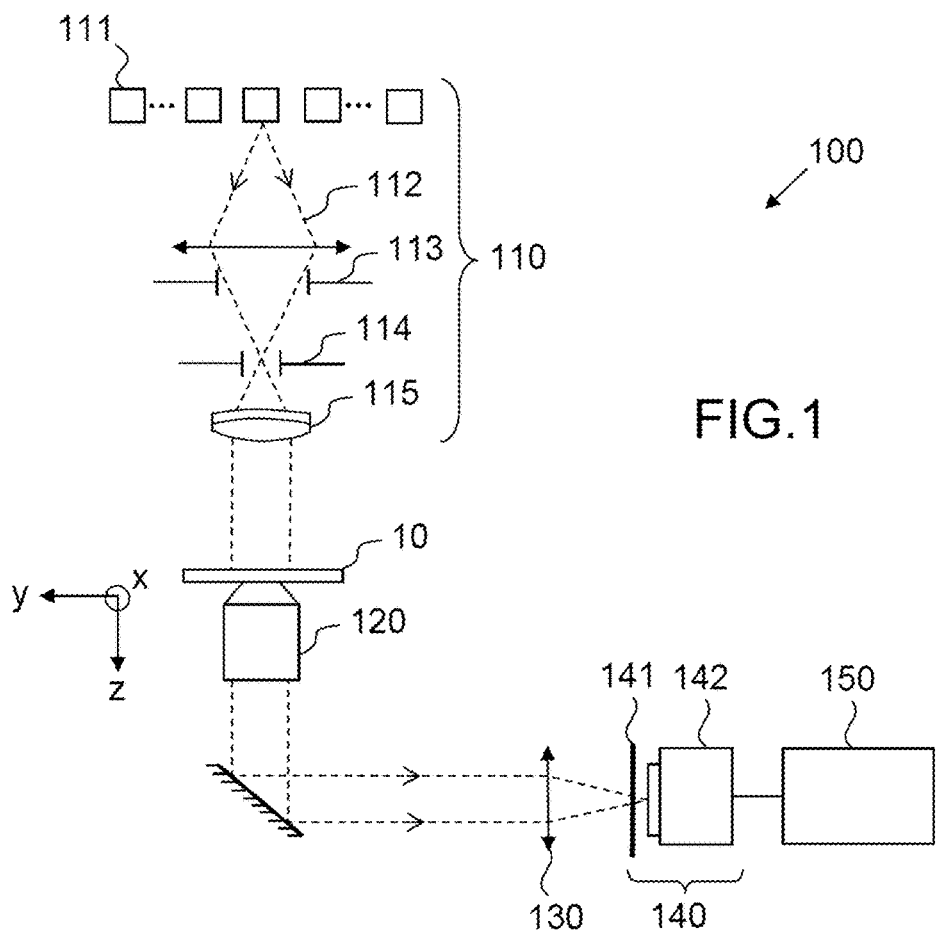
FIG. 1 represents: Diagram of an example of optical characterization device according to the present description.

First Part: Example of a Device for the Optical Characterization of Particles According to the Present Description FIG. 1 illustrates an example of a device 100 according to the present description for the optical characterization of a particle present in a sample 10.

The device 100 comprises a light source 110 configured for forming a beam for illumination of the sample 10. For example, the light source 110 comprises a plurality of light-emitting diodes or LEDs 111, a lens 112, and field diaphragms 113 and aperture diaphragms 114. The device 100 further comprises an optical system 120 comprising, for example, a microscope objective and a unit 130, 140 for the acquisition of at least one phase image and at least one intensity image of the particle illuminated by the illumination beam, the acquisition being carried out in an analysis plane arranged in the image space of said optical system 120.

The device 100 further comprises a calculation unit 150 configured for the determination of at least one optical property of said at least one particle from said at least one phase image and at least one intensity image, said at least one optical property comprising at least one of the complex dipolar polarizability, the effective absorption cross section, the effective scattering cross section, the effective extinction cross section.

The sample 10 is positioned during operation in the object space of the optical system 120. Further, in this example, the acquisition unit comprises a multiwave lateral shearing interferometer 140. The interferometer 140 comprises a two-dimensional diffraction grating, or grid, 141 located at a millimetric distance from a conventional camera 142.

Figure 2:
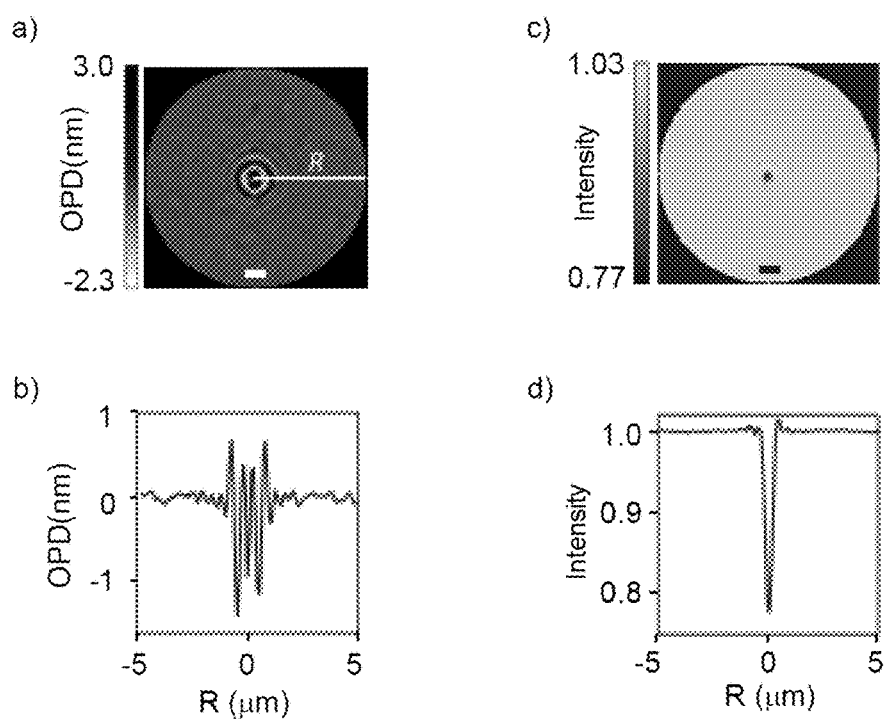
FIG. 2 represents: (a) OPD and (c) intensity images of a gold NP with a diameter of 100 nm (Scale: 1 µm); (b) and (d) profiles corresponding respectively to images (a) and (c).

Examples of intensity and phase images of a nanoparticle, which were acquired by quadriwave lateral shearing interferometry, as well as the profiles of such images are shown in FIG. 2 (FIGS. 2a and 2b, respectively, for the images and FIGS. 2c and 2d, respectively, for the profiles of these images).

Multiwave, for example two-wave, three-wave or quadriwave (QLSI), lateral shearing interferometry is an optical technique capable of mapping not only the intensity but also the phase of a given light beam in two dimensions in a single interferometric acquisition. Mapping the phase of a light beam equates to mapping the profile of the wavefront of the light beam or, equivalently, the optical path difference (OPD) created by a subject of the study. A QLSI wavefront detection camera comprises a two-dimensional (2D) diffraction grating (generally referred to as a modified Hartmann mask, MHM) located at a millimetric distance from a conventional camera (cf. article by J. Primot et al. [Ref. 4]). By virtue of the grating, the wavefront is reproduced in four copies which are identical but slightly offset and interfere with one another, leading to the formation of an interferogram on the sensor of the camera. The interferogram is processed numerically in real-time (about 1 image per second) in order to recover the intensity and wavefront profiles of the incident light. The interferometric nature of the measurements makes this technique extremely sensitive. The QLSI camera used in the experimental examples presented below comprises a Phasics© Sid4 Element reimager associated with a Zyla© 5.5 sCMOS sensor, and has a sensitivity of 0.3 nm $Hz^{-1/2}$. It is important to note that QLSI benefits from the advantages of an interferometric measurement without suffering from its drawbacks: no reference beam is required as for other interferometric techniques, nor any complex alignment which is sensitive to external perturbations. The relative positioning of the MHM with respect to the camera is carried out once and for all, and is not sensitive to external perturbations such as temperature variation, mechanical drift or air flow. Several examples based on the use of QLSI, such as cell imaging, thermal imaging, and the imaging of 2D materials, are already described, for example, in the article S. Khadir et al. [Ref. 5]. Metrology on NPs seems to be a new application of QLSI, and more generally of quantitative phase imaging.

In the example of FIG. 1, Köhler illumination was used to illuminate the sample using a controlled optical wave (controlled illuminated zone and numerical aperture). A plurality of LEDs 111 of different colors were used in order to vary the wavelength of the illumination and carry out a spectral measurements (for example 405, 420, 430, 455, 470, 505, 530, 565, 590, 617, 625, 665, 680, 700, 730, 780, 850 nm).

A method for the optical characterization of a particle according to the present description may be carried out in the following way, for example by means of the device described in FIG. 1. In each measurement, a reference image may initially be taken in a free zone (without any object) before acquiring an image with the object of interest in the field of vision, which corresponds to the conventional approach in QLSI, intended to eliminate any imperfection of the incoming light beam. The normalized complex transmission coefficient $t/t_0$ is expressed according to Equation 6 below as a function of the complex transmission coefficient of the sample without a particle $t_0(x,y)$ and the complex transmission coefficient of the sample in the presence of the particle of interest, i.e. $t(x,y)$:

$$\frac{t}{t_0} = \sqrt{T} \exp\left(i\frac{2\pi}{\lambda_0}\delta\ell\right) \quad \text{[Math 6]}$$

where $\delta\ell(x,y)$ is the distortion of the wavefront, or equivalently the optical path difference caused by the presence of the particle. T is the transmittance of the sample. $\lambda_0$ is the vacuum wavelength of the light. T and $\delta\ell$ are the two quantities mapped simultaneously by QLSI from a single measurement. QLSI thus makes it possible to access the complex transmission $t(x,y)$ of a sample. Of course, units for acquisition of the phase and intensity images other than those involving QSLI may be used for carrying out the method described below.

The way in which processing of an image of $t(x,y)$, that is to say processing of the intensity and wavefront images (PIWI processing), may be performed in order to determine the complex polarizability of particles of any nature is explained in the next section.

Second Part—PIWI Processing in Order to Determine the Polarizability of a Particle—Description of the Theoretical Model The complex dipolar polarizability $\alpha$ of an NP is defined by Equation 7:

$$p = \varepsilon_0 \alpha E_{ex} \quad \text{[Math 7]}$$

where p is the complex amplitude of the electrical dipole moment of the NP and $E_{ex}$ is the complex amplitude of the local electric field. The NP is placed close to an interface between two semi-infinite media, the medium of the nanoparticle and the medium of the substrate, which are respectively characterized by their refractive indices n and $n_S$. It is known (see for example [Ref. 6]) to calculate the image of such a dipole using a microscope, by means of a formalism based on Fourier transforms. The Applicants have shown for the first time that it is possible to ascertain the actual nature of the dipole, and in particular the polarizability $\alpha$, from only the phase $\delta\ell$ and intensity T images.

More precisely, the Applicants have demonstrated that it is possible to experimentally measure the polarizability $\alpha$ (and other optical properties) from the intensity T and phase $\delta\ell$ images measured. To this end, the Applicants have established a relation which links the complex polarizability $\alpha$ of a particle and the complex image $$\frac{t}{t_0}(x,y):$$

$$\alpha = \frac{i(n+n_S)}{k_0} \iint \left(1 - \frac{t}{t_0}(x,y)\right) dxdy \quad \text{[Math 8]}$$

where $t/t_0$ is the normalized complex transmission coefficient and n and $n_S$ are the refractive indices respectively of the environment of the particle and of the substrate.

Thus, the real and imaginary parts of the polarizability of any single particle may be recovered as functions of T(x,y) and δℓ (x,y) by using the following relations:

$$\alpha_r = \frac{(n+n_S)}{k_0} \int\int \sqrt{T(x,y)} \sin(k_0 \delta\ell(x,y)) \, dxdy \quad \text{[Math 9]}$$

$$\alpha_i = \frac{(n+n_S)}{k_0} \int\int [1 - \sqrt{T(x,y)} \cos(k_0 \delta\ell(x,y))] \, dxdy \quad \text{[Math 10]}$$

The two measurements of T(x,y) and δℓ (x,y) are therefore sufficient in order to determine the complex polarizability. In practice, this involves a sum of pixels over the zone containing the image of the particle. No assumption is necessary regarding the nature (dielectric or metal) or the shape of the particle. Only prior knowledge of the refractive indices of the medium, n and $n_S$, as well as the illumination wavelength $\lambda_0$ is required.

Third Part—Experimental Results—Gold Nanospheres

In order to illustrate the applicability of the formalism and the method which were described above, this section presents measurements on isotropic metal NPs (gold nanospheres) in a homogeneous medium. This simple case makes it possible to compare the measurements easily with theoretical calculations using Mie theory.

Gold nanospheres with a diameter of 100 nm were dispersed on a glass substrate then covered with glycerol (n=1.5, close to the index of the glass substrate) in order to obtain a homogeneous medium. The measurements were carried out with an incident wavelength of $\lambda_0$=530 nm. Since the NP is isotropic, the polarizability does not depend on the polarization state of the incident light and constitutes a scalar physical quantity.

FIGS. 2a and 2c show the OPD and intensity images measured, and FIGS. 2b and 2d show their respective profiles. Since the size of the particle is less than the diffraction limit, its image resembles an Airy pattern. The determination of the real and imaginary parts of the polarizability according to Equations 9 and 10 comprises numerical summation of the pixels of a combination of OPD and intensity images. Even though theoretically this sum of pixels should be made over an infinitely large zone, experimentally it is sufficient to take the sum, for example, over a disk with a radius R selected so as to contain all the diffraction rings. In the present case, the measured polarizability is α=(−2.03±0.26)·10⁶+i(3.25±0.26)·10⁶ nm³. The value calculated by using Mie theory, i.e. according to the equation:

$$\alpha_{th} = i \frac{6\pi n^2}{\lambda_0 k^3} a_1 \quad \text{[Math 11]}$$

where $a_1$ is the dipolar Mie coefficient, and $\alpha_{th}$=−1.59·10⁶+i 3.55·10⁶ nm³, in agreement with the measurements. The slight difference between the experimental and theoretical values may be explained by the size dispersion of the colloidal NPs used.

Figure 3:
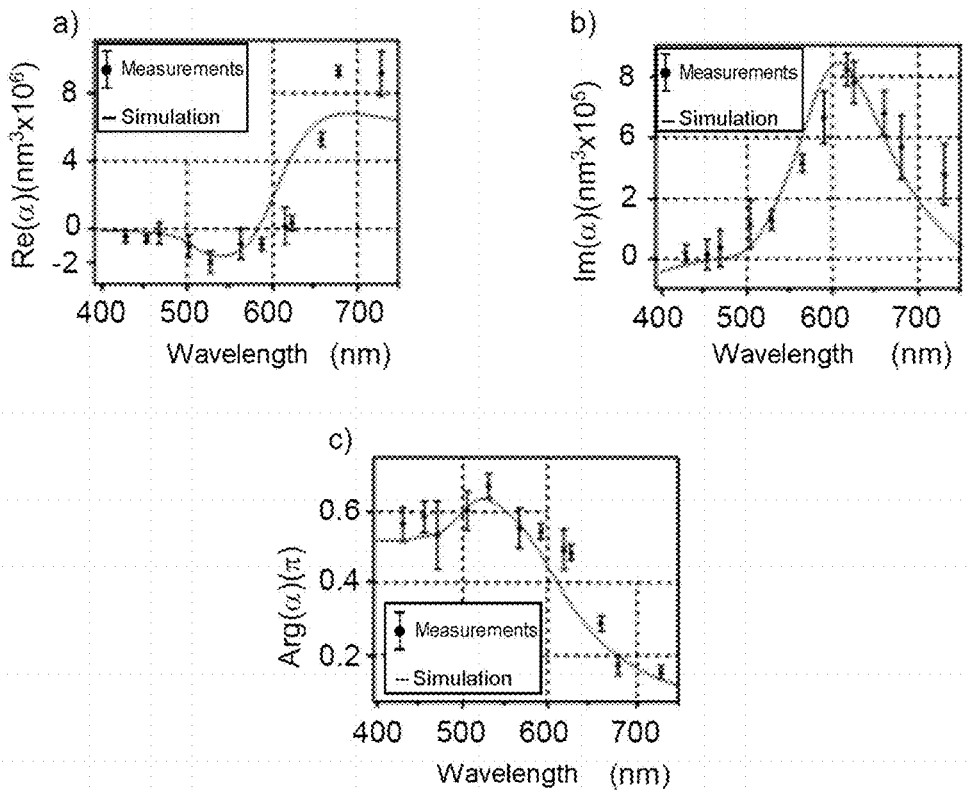
FIG. 3 represents: Polarizabilities of 100 nm gold nanoparticles measured experimentally in the visible range. (a) Real part, (b) imaginary part, and (c) argument of the polarizability. The measurements were carried out in a homogeneous medium with a refractive index of 1.5. The experimental results are compared with theoretical calculations based on Mie theory.

In what follows, the spectral measurements of the complex polarizability of the same 100 nm gold NP over the entire visible range are presented. The intensity and OPD images of the NP were recorded by QLSI for a set of different illumination wavelengths. For each wavelength, the complex polarizability was extracted. The measurements were carried out in a homogeneous medium (NP covered with glycerol on a glass substrate) and the results were compared with the polarizability calculated by using Mie theory. The real and imaginary parts and the argument of the polarizability are illustrated in FIGS. 3a to 3c, respectively. The measured polarizability spectra reproduce well those calculated. The imaginary part (cross section proportional to the extinction) has a peak around $\lambda_{res}$=610 nm, which corresponds to the wavelength of the localized surface plasmon resonance (LSPR). This resonance is associated with an abrupt transition of the values of Re (α) and Arg (α).

Metal Particles Versus Dielectric Particles

Figure 4:
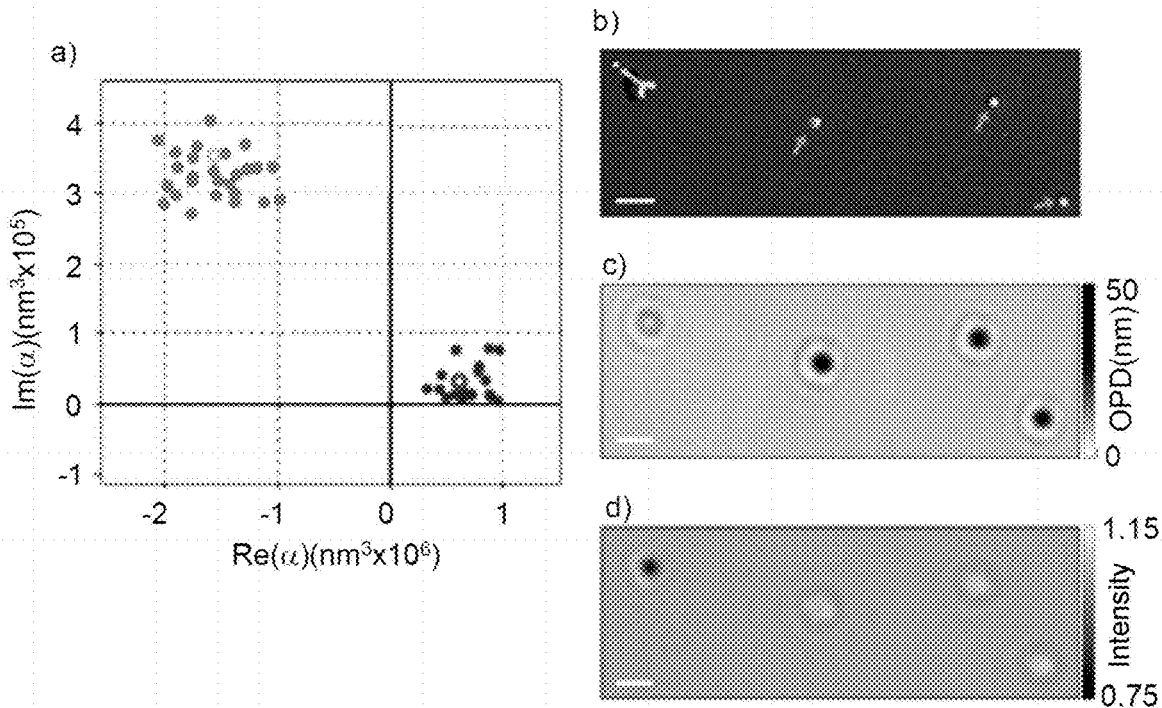
FIG. 4 represents: (a) Measured polarizabilities of gold (gray) and polystyrene (black) NPs dispersed on the same glass substrate, represented in the complex plane, (b) SEM (scanning electron microscopy) image, (c) OPD (phase), (d) intensity images of gold and polystyrene NPs. In image (b), the gold particles are indicated with a spur and the polystyrene ones with an arrow. Scale: 2 µm.

In this section, the capacity of the PIWI processing to discriminate NPs with a different composition is demonstrated, as well as the effect of the NP size dispersion on the polarizabilities measured. Experiments were carried out on gold and polystyrene nanoparticles dispersed randomly on the same glass substrate. The NPs come from commercial colloidal solutions assumed to be of monodisperse shape and size (nanospheres with a diameter of 100 nm for gold and 200 nm for polystyrene). The sample was analyzed by PIWI processing in order to determine the polarizability of a randomly selected set of NPs. The measurements were then correlated with scanning electron microscope (SEM) images, which made it possible to confirm the nature of the NPs as well as their actual sizes and morphologies. The results are presented in FIG. 4. The measured polarizabilities are presented on the complex plane (imaginary part in relation to the real part of the polarizability) in FIG. 4a. Each point corresponds to one NP. The black circles correspond to polystyrene and the gray circles correspond to gold, as determined by SEM. Examples of SEM images in correlation with OPD and intensity images are presented in FIGS. 4b, 4c and 4d, respectively. The contrast of the polystyrene NPs (indicated by arrows on the SEM images) is less than that of gold (indicated by a spur). It may be seen that the gold and polystyrene NPs occupy two different regions of the complex plane (FIG. 4a), which are associated with different dispersions of the polarizability values. In the case of gold, the dispersion is not due to measurement errors. It comes mainly from the dispersion in the NP diameters, which vary from 110 nm to 140 nm according to the scanning electron microscopy (SEM) measurements. These results illustrate the usefulness of the PIWI processing and of working in the complex plane of the polarizability α in order to distinguish different types of nanoparticles.

Independence of the Focusing

In this section it is demonstrated that, counterintuitively, changing the focusing of the microscope does not affect the estimation of the complex polarizability. In other words, the integrations or summations of pixels of the images of an NP according to Equations 9 and 10 are independent of the focusing. This can be shown theoretically, and the measurements confirm this prediction. The effect of defocusing on the determination of the polarizability of a 100 nm gold NP was determined by acquiring OPD and intensity images at different z positions, as illustrated in FIG. 5a.

The z position corresponds to an axial position of the sample (along an optical axis of the optical system 120) with respect to a reference position for which the analysis plane and the plane of the sample containing the particle are optically conjugate.

As predicted by the theory, the OPD and intensity images depend strongly on the focusing. Nevertheless, the real and imaginary parts of the polarizability which are extracted for each z position, which are illustrated by FIG. 5b, show no dependency greater than the error bars in respect of the z defocusing.

Figure 5:
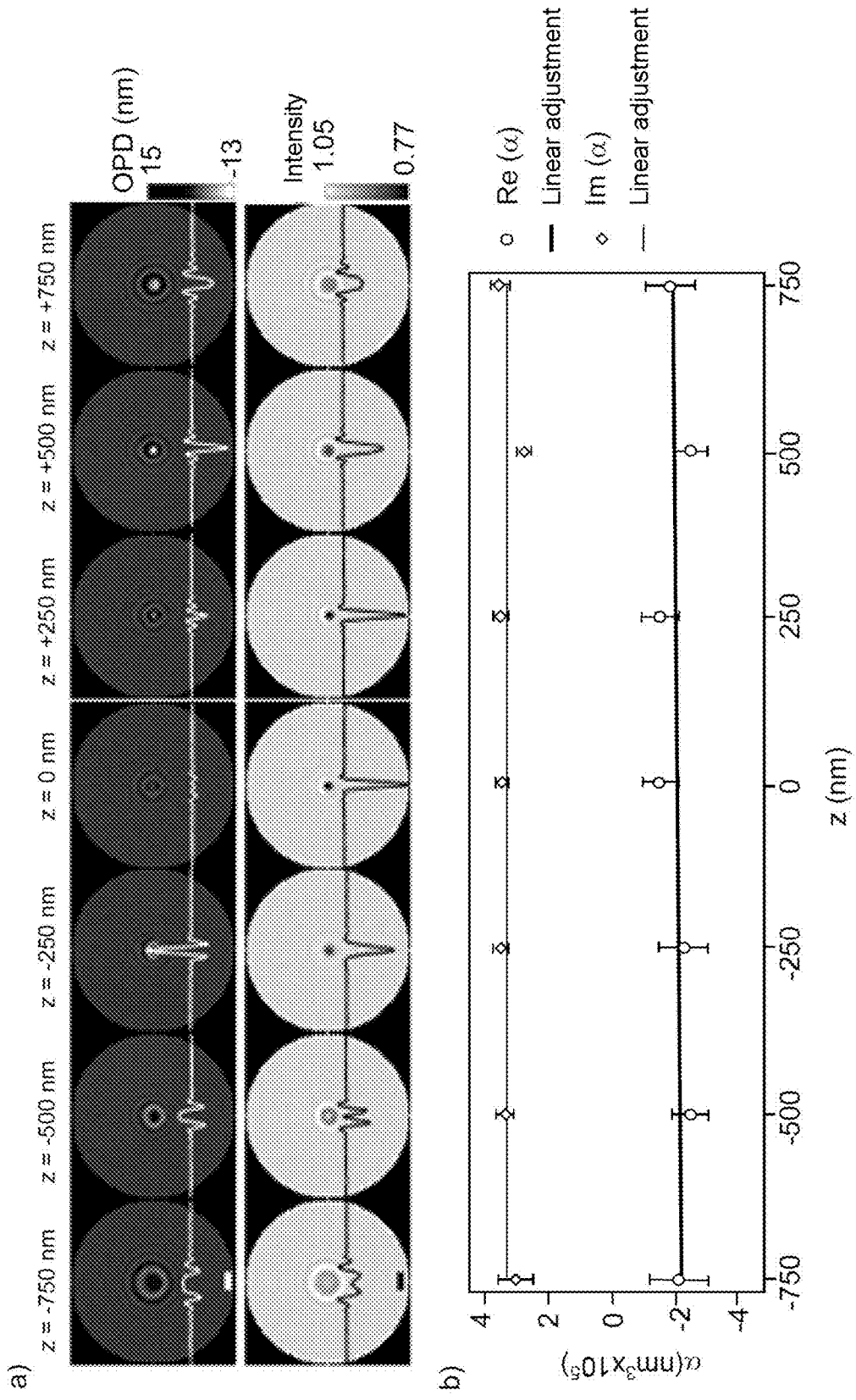
FIG. 5 represents: (a) Intensity and OPD images of 100 nm gold NPs at different z positions of the sample, with their profiles. (b) Real and imaginary parts of the polarizability for different z positions, showing the absence of an effect of defocusing of the microscope on the estimation of α. Scale: 1 µm.

This observation offers a way of improving the precision of the polarizability measurements by forming the average of a series of intensity and OPD images taken at different z positions (such as the average of the series of images which is presented in FIG. 5a). Since all these images give the same estimation α, their average still gives the same estimation, but with at least two advantages. First, a gain of $\sqrt{N}$ is obtained in the signal-to-noise ratio, where N is the number of images. The second advantage is that the average of the images reduces the spatial extent of the diffraction rings of the Airy pattern, thus allowing a sum of the pixels over a reduced zone. This makes it possible, for example, to study nanoparticles which are closer to one another and have Airy rings which would overlap without such averaging. In the case of FIG. 5, by using this method, the error bar of Re (α) has decreased from $4 \cdot 10^{-3}$ to $1.7 \cdot 10^{-3}$ (in units of $\lambda^3$) when the average of the polarizabilities at different z positions is taken.

Independence of the Numerical Aperture

Figure 6:
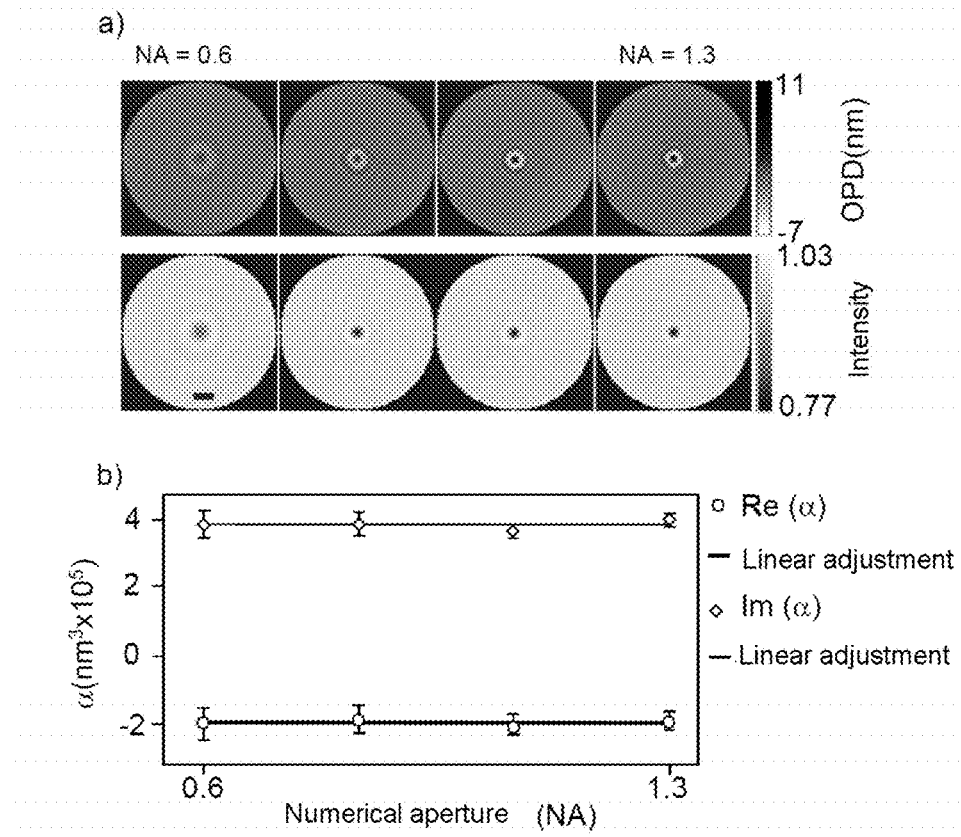
FIG. 6 represents: (a) Intensity and OPD images of gold nanoparticles measured with different numerical apertures of the objective. (b) Real and imaginary parts of the polarizability which are measured from these images, showing the absence of an effect of the numerical aperture on the determination of the polarizability value.

In this section, it is experimentally demonstrated that modifying the numerical aperture (NA) of the microscope objective does not affect the estimation of the complex polarizability. This effect is also predicted by the theory. In order to study the effect of the NA experimentally, OPD and intensity images of 100 nm gold NP were recorded for different values of NA with the aid of a microscope objective with a variation of NA from 0.6 to 1.3 (see FIG. 6a). Clearly, the diffraction pattern depends strongly on the NA used. Nevertheless, the NA does not affect the complex polarizability determined from the images, as indicated in FIG. 6b.

The Case of Anisotropic Nanoparticles

This section is given over to the measurement of the complex polarizability of NPs having anisotropic shapes. In this case, the optical properties of the NP depend on the polarization of the incident light. Thus, the polarizability of the NP is no longer scalar but corresponds to a 2×2 tensor.

Gold nanorods manufactured on a glass substrate were studied. The positions of the nanorods are random, but they have the same orientation. The density of the nanorods is relatively low in order to obtain a high level of separation and to permit the characterization of isolated nanorods. The illumination is at normal incidence, and the measurement method is aimed in this case at measuring the polarizability in the plane. For the shape in question, two polarizations are privileged: one along the major axis and another along the minor axis of the nanorod. Thus, the intrinsic values of the polarizability in the plane may be extracted according to the following expression:

$$\alpha = \begin{pmatrix} \alpha_{xx} & 0 \\ 0 & \alpha_{yy} \end{pmatrix} \qquad \text{[Math 12]}$$

In order to do this, the illumination light was polarized along the major axis (or respectively the short axis) and the OPD and intensity images were recorded and processed in order to extract $\alpha_{xx}$ (or respectively $\alpha_{yy}$). The spectra of the real and imaginary parts and arguments of the polarizability along the long and short axes of the nanorods were compared with the polarizabilities calculated with the aid of the DDA method (for "Discrete Dipole Approximation", a numerical technique suitable for taking the effect of a substrate into account). The comparison showed a good agreement with the experiments.

These results show that PIWI processing is also capable of characterizing structures which are more complex than spheres.

Fourth Part: PIWI Processing in Order to Determine the Polarizability of a Dense Distribution of Nanoparticles In the previous section, sparse NPs separated by distances much greater than the optical diffraction limit were considered, which made it possible to study single NPs. In practice, applications do not always involve isolated NPs but rather distributions which are sometimes dense and uniform, produced for example by electron beam lithography, by block copolymer micellar lithography, by nanosphere lithography, etc. In this case, the layer of NPs may be seen as an effective 2D support characterized by an effective 2D polarizability $\alpha_{2D}$ which has the dimension of a length (rather than a volume). The characterization of 2D systems is easier and more common in the literature than the study of a single NP. In particular, measurements based on combined transmission and reflection with modified Fresnel equations have already been reported in the literature for characterizing the optical properties of the layers. (cf. articles by C. L. Holloway et al. [Ref. 7], by A. Mendoza-Galván et al. [Ref. 8], by R. Ogier et al. [Ref. 9], and by G. Lavigne et al. [Ref. 10]. In the next section, it is demonstrated that QLSI interferometry is also capable of characterizing a polarizability $\alpha_{2D}$.

Description of the Theoretical Model

The theoretical bases of PIWI processing make it possible to access the effective linear polarizability of a dense distribution of NPs.

Here, the distribution of NPs is considered as a uniform and infinitely thin layer placed at the interface between two media which are characterized by their refractive indices n and $n_S$. The 2D layer of NPs is described by means of its complex surface polarizability $\alpha_{2D}$, defined by the equation:

$$P_{2D} = \varepsilon_0 \alpha_{2D} E_0 \qquad \text{[Math 13]}$$

Where $P_{2D}$ is the complex amplitude of the surface polarization factor induced by the 2D distribution of the NPs and $E_0$ is the amplitude of the incident electric field. The dimension of $P_{2D}$ is a length [m] and is linked with the effective polarizability of a single NP $\alpha_{e\!f\!f}$ by $\alpha_{2D} = \rho \alpha_{e\!f\!f}$, where $\rho$ is the surface density of NPs. In this case, $\alpha_{e\!f\!f}$ is not necessarily the polarizability of the isolated NP, particularly if the NPs are very close to one another and exhibit near-field optical coupling. The quantity measured in this case is rather an effective NP polarizability in the layer.

This system may be modelled with the aid of modified Fresnel equations. Such a model has previously been used to determine the 2D complex optical conductivity ($\sigma_{2D}$) of 2D materials (graphene and $MoS_2$ (cf. article by S. Khadir et al. [Ref. 5])). A 2D conductivity is another physical quantity which may be used in order to characterize a 2D material. It is defined as follows: $J_{2D} = \sigma_{2D} E$, where $J_{2D}$ is the 2D electronic current density and E is the total electric field at the interface. These formalisms consider normal incidence illumination and E is contained in the 2D layer. The complex optical conductivity and the polarizability are equivalent because they are linked by $\sigma_{2D} = \varepsilon_0 c[(n+n_S)^{-1} + i(k\alpha_{2D})^{-1}]^{-1}$. In the case of normal incidence, the transmission coefficient $t(x,y)$ of such a system is linked with the complex polarizability $\alpha_{2D}$, as described in the article by S. Khadir et al. [Ref. 5], by the equation:

$$t = \frac{2n}{n_S + n - ik_0 \alpha_{2D}} \qquad \text{[Math 14]}$$

By normalizing this quantity by the transmission in the absence of the layer, namely:

$$t_0 = \frac{2n}{n_S + n} \quad [\text{Math 15}]$$

the following Equation 16 is obtained:

$$\frac{t}{t_0} = \frac{1}{1 - \frac{ik_0 \alpha_{2D}}{n_S + n}} \quad [\text{Math 16}]$$

Thus, the complex polarizability $\alpha_{2D}$ may be expressed as a function of the normalized transmission coefficient $t/t_0$ measured by QLSI according to the equation $$\alpha_{2D} = \frac{i\lambda_0 (n_S + n)}{2\pi}\left(\frac{t_0}{t} - 1\right) \quad [\text{Math 17}]$$

where $$\frac{t_0}{t} = \frac{1}{\sqrt{T}} e^{-i\frac{2\pi}{\lambda_0}\delta\ell} \quad [\text{Math 18}]$$

and where T and $\delta\ell$ are the measured transmission and OPD images.

Since $\alpha_{2D} = \rho \alpha_{\mathit{eff}}$, the effective polarizability of a single NP (which takes into account the coupling between the NPs in the layer) may be expressed according to:

$$\alpha_{\mathit{eff}} = \frac{i\lambda_0 (n_S + n)}{2\pi \, \rho}\left(\frac{t_0}{t} - 1\right) \quad [\text{Math 19}]$$

By using Equation 19, the real $\alpha_{r,\mathit{eff}}$ and imaginary $\alpha_{i,\mathit{eff}}$ parts of $\alpha_{\mathit{eff}}$ may be expressed as a function of the quantities T and $\delta l$ measured by QLSI:

$$\alpha_{r,\mathit{eff}} = \frac{\lambda_0 (n_S + n)}{2\pi \, \rho}\frac{1}{\sqrt{T}}\sin\left(\frac{2\pi}{\lambda_0}\delta\ell\right) \quad [\text{Math 20}]$$

$$\alpha_{i,\mathit{eff}} = \frac{\lambda_0 (n_S + n)}{2\pi \, \rho}\left[\frac{1}{\sqrt{T}}\cos\left(\frac{2\pi}{\lambda_0}\delta\ell\right)\right] \quad [\text{Math 21}]$$

Experimental Results

The measurements were carried out on a dense distribution of gold nanorods deposited on a glass substrate. The surface density of the NPs is $\pi = 1.9 \cdot 10^{-5}$ nm$^{-2}$. The measurements were carried out for the two polarization states: along the long and short axes of the nanorod. The estimated effective real and imaginary parts and the argument of the polarizability were measured using the formalism described above. The imaginary part (proportional to the effective extinction cross section) reproduces well the resonant peaks of the plasmon along the short and long axes of the nanorod. These resonances are represented by an abrupt transition for the real part and the argument of the polarizability. Here as well, the experimental results are compared with the polarizability calculated for a single nanorod, obtained by DDA (simulation curves the same as that of the previous section). The agreement is quite good, showing that the effective polarizability determined here is equivalent to that measured on an isolated NP in the previous section. However, the polarizability values in the case of a dense distribution of NPs are slightly greater than those with the isolated NPs, which may be attributed to the contribution of the near-field optical coupling between the NPs.

Figure 7:
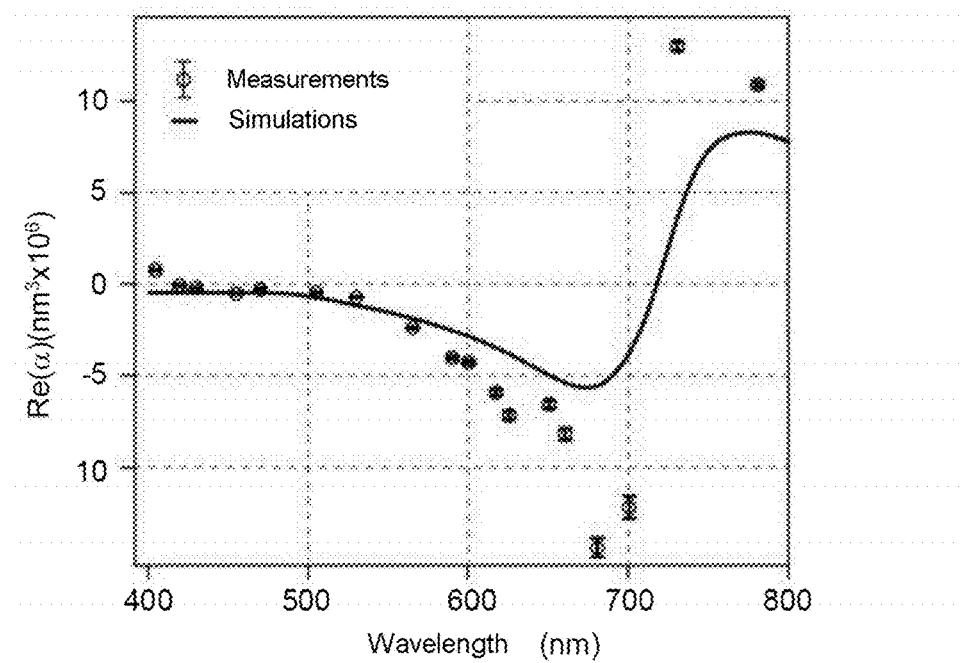
FIG. 7 represents: Real part of the polarizability of a gold nanorod as a function of the wavelength measured by quadriwave lateral shearing interferometry. An abrupt jump is observed toward 700 nm, corresponding to the plasmon resonance of the nanoparticle.

Fifth Part: Applications to the Characterization of the Interaction of a Target Molecule with a Particle FIG. 7 represents the real part of the polarizability of a gold nanorod as a function of the wavelength measured by quadriwave lateral shearing interferometry. An abrupt jump is observed toward 700 nm, corresponding to the plasmon resonance of the nanoparticle. Such an abrupt jump makes it possible to obtain a sensitive detection probe by measuring the variation over time of this optical property of the nanoparticle in the presence of target molecules in the sample.

Figure 8:
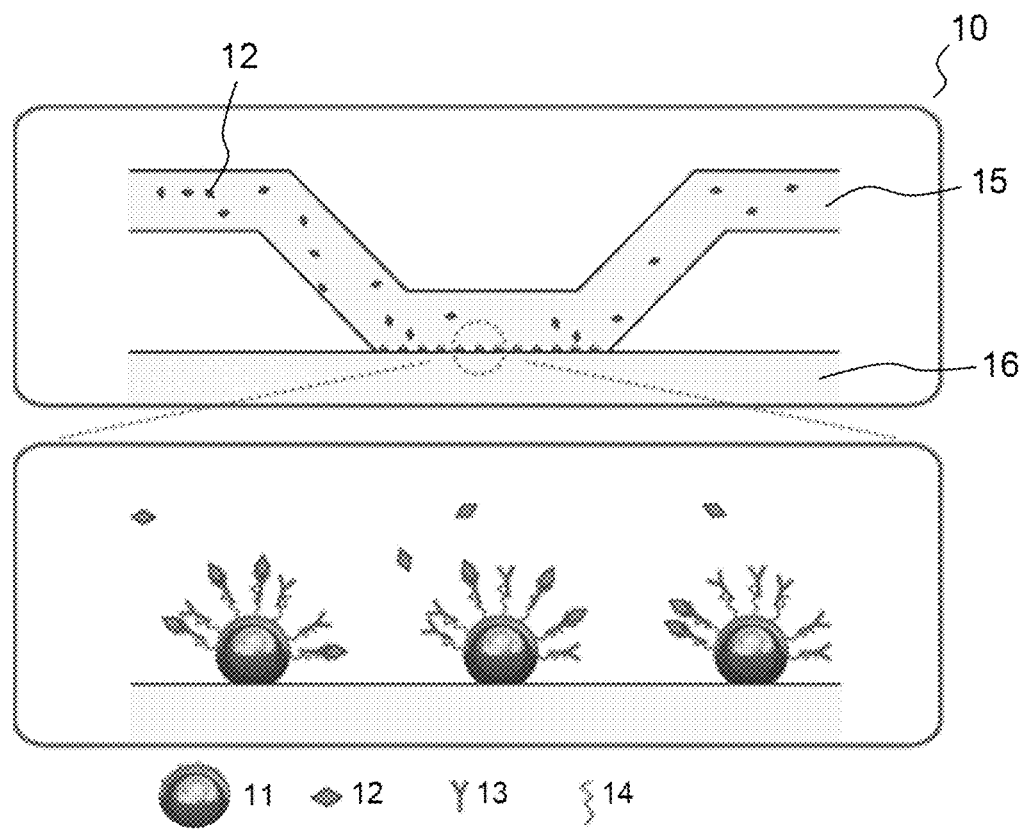
FIG. 8 represents: Example of a sample composed of a transparent substrate on which gold nanoparticles are fixed. In this example, the nanoparticles are functionalized with proteins of interest, i.e. antibodies.

FIG. 8 illustrates an example of a sample 10 which may be analyzed by the detection method according to one or more exemplary embodiments of the present description. In this example, the sample 10 comprises a transparent glass substrate 16 to which gold nanoparticles 11 are attached covalently. As an alternative, the particles of the sample may be manufactured chemically and deposited on the substrate, for example by solvent evaporation, by spin coating, or else lithographed via the deposition of a metal film, for example, by electron beam lithography, or by nanosphere lithography.

In this example, the nanoparticles 11 are functionalized with proteins of interest, i.e. antibodies 13 in this case, which have a certain affinity for the target molecules 12 and are linked to the nanoparticles 11 by spacers (or linkers) 14. A microfluidic circuit 15 makes it possible to add the target molecules 12 to be detected into the sample 10. In this example, this addition is carried out by circulating a solution comprising the target molecules 12 in the microfluidic circuit 15. Such a sample 10 may, for example, be employed in an example of a detection device 100 as described in FIG. 1, which is configured in order to determine over time at least one optical property of the at least one particle.

The calculation unit 150 is further configured for characterization of the interaction with said at least one target molecule 12 on the basis of a measurement of the variation of said at least one optical property over time.

Detection of Molecular Interactions

According to one example, the characterization of the interaction with a target molecule comprises the detection of interactions between a particle and a target molecule, or between a molecule or ligand attached to a particle. The detection equates to providing a qualitative response to the question of ascertaining whether particles and target molecules have an affinity, or respectively whether molecules A (for analyte or target molecule) and molecules L (for ligand) have an affinity. Such molecules A and L are, for example, respectively referenced 12 and 13 in FIG. 8.

Figure 9:
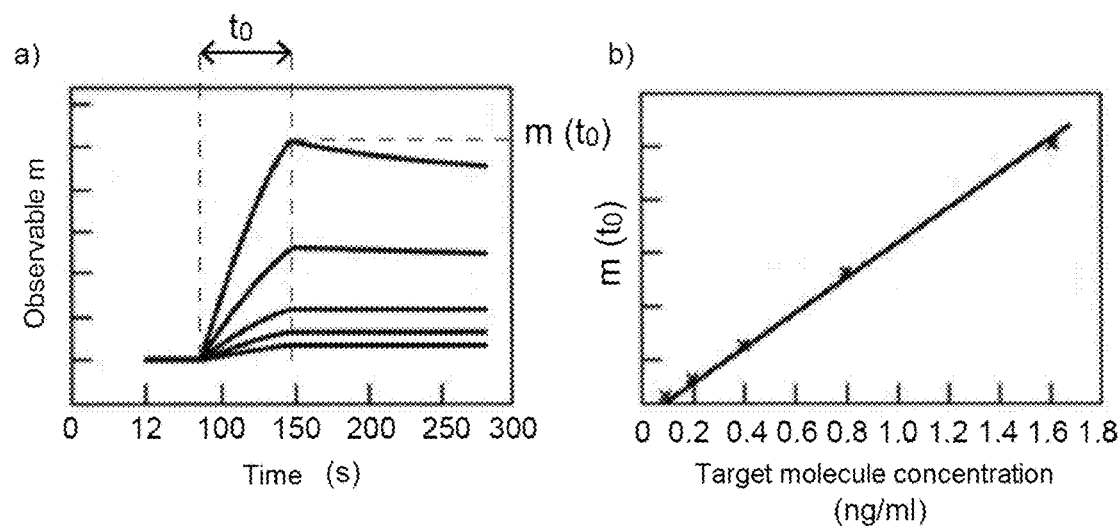
FIG. 9 represents: Quantitative measurement of the target molecule concentration in the sample; (a) Measurement of the observable m over time for different target molecule concentrations, (b) calibration curve of the observable m as a function of the target molecule concentration.

An example of the detection of interaction between molecules A and L is detailed below and illustrated by FIGS. 8 and FIG. 9a.

In a first step, a solution not containing target molecules 12 is injected into a microfluidic channel 15 connected to a substrate 16 onto which particles 11 are attached. The particles 11 are functionalized by ligand molecules L, referenced 13, via a spacer 14 connecting the ligand 13 to the particle 11.

An observable m corresponding to one of the optical properties being characterized for one or more particles 11 is measured in the presence of this solution, at a well-determined time $t_0$ after the start of the injection of the solution. Said optical property or properties comprise for example the real part, the imaginary part, the argument or the norm of the complex polarizability of the particle or particles.

In a second step, the same liquid is injected except that this time it contains the target molecules A, referenced 12. New values of observables m of the same particles 11 are measured at the same determined time $t_0$. A variation of the value of the observable m may be due to the attachment of the target molecules 12 to the particles 11, but also to the mere presence of the target molecules 12 in solution, which changes the index of the latter when, for example, the concentration of target molecules 12 is high. This second contribution does not express attachment between target molecules 12 and ligands 13. This effect of the medium (or "bulk effect"), corresponding to the noise level, may be quantified by repeating the measurements corresponding to the two steps (with and without target molecule 12), in the absence of a ligand 13 on the particles 11. The variation of the value of the observable due to the bulk effect is thus obtained, which will need to be subtracted from the previous variation of the observable value. An observable value measured above the noise level of the system will be an indication that the target molecules 12 and the ligands 13 have an affinity.

Measurements of Molecular Concentrations

The sequence of measurements which is described above may be applied successively with N solutions of analytes A or target molecules with known concentrations $[A]_n$, $n \in [1, N]$. N values of observables $m_n$ are thus obtained. The data collected ($[A]_n$, $m_n$) constitute a calibration curve, which is represented in FIG. 9b.

A solution which contains target molecules and has an unknown concentration of target molecules is then injected into the sample. The value m is measured and entered on the calibration curve in order to determine the concentration of target molecules.

Measurements of Affinity Constant $K_A$

In the case of the characterization of the interaction between an analyte A and a ligand L attached to the particle, the affinity constant may be defined by the following Equation (22):

$$K_A = \frac{k_a}{k_d} = \frac{[AL]}{[A][L]} \qquad [\text{Math 22}]$$

in which $k_a$ is the association constant of the complex AL (or "analyte/ligand complex" and $k_d$ is the dissociation constant of the complex AL.

Figure 10:
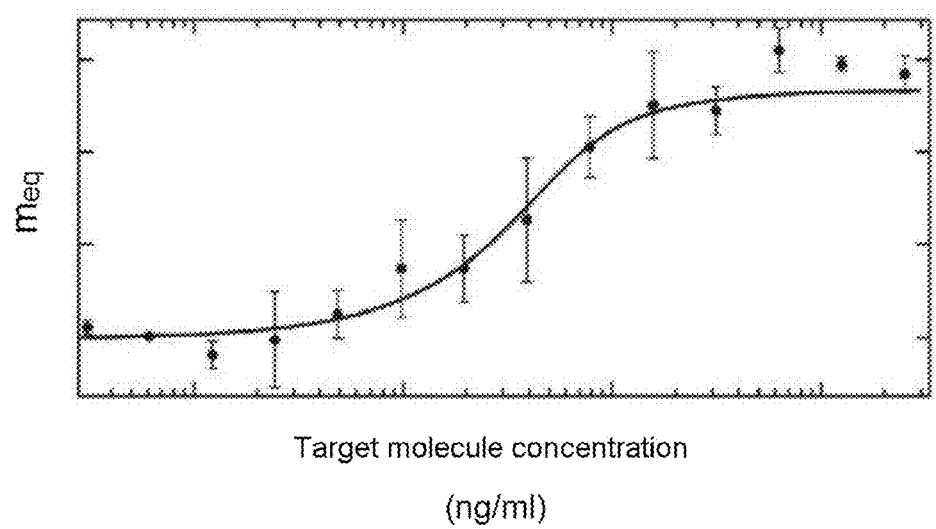
FIG. 10 represents: Measurement of the observable at the equilibrium $m_{eq}$ for a series of target molecule concentrations.

The affinity constant $K_A$ may be determined by measuring the observable $m_{eq,i}$ for an entire series of analyte concentrations $[A]_i$ in the equilibrium state, that is to say by waiting for a sufficiently long time that the observable no longer varies in the short term. The plot of $m_{eq,i}$ as a function of $[A]_i$ may then have the appearance of the curve represented in FIG. 10.

A fit of this curve involving Equation (22) may then make it possible to determine the affinity constant $K_A$.

Measurements of Association $k_a$ and Dissociation $k_d$ Constant

The association $k_a$ and dissociation $k_d$ constants are defined by the chemical reaction (1):

[Chem 1]

Figure 11:
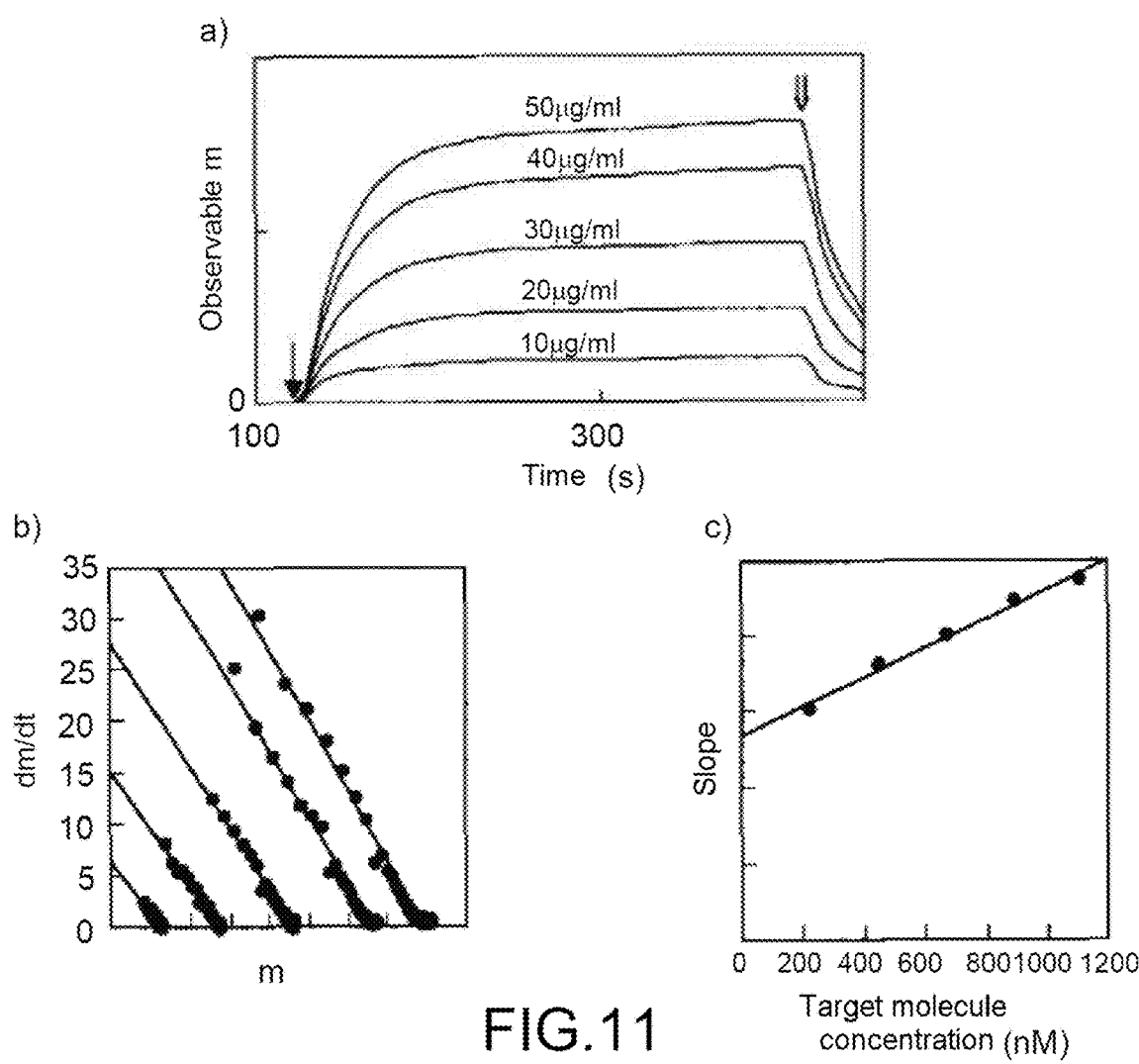
FIG. 11 represents: (a) Measurement of the observable m over time for a series of target molecule concentrations, (b) plot of the derivative of the observable m with respect to time for a series of target molecule concentrations, (c) plot of the slopes of the straight lines of image (b) as a function of the target molecule concentration.

They may be measured by following the time variation of the signal of the observable over time for a series of concentrations $m(t;c_i)$. An example of this variation for 5 different analyte concentrations (10, 20, 30, 40 and 50 mg/ml) is illustrated by FIG. 11a, in which the arrows at the start and end of the measurement respectively represent the start and end of the injection of a solution of analytes or target molecules into a sample. The method consists in first fitting the variation of m(t) following the injection in question by an increasing exponential (cf. FIG. 11a).

The coefficients $p_i$ of such exponentials correspond to the slopes of the straight lines obtained by plotting the derivative of the observable m with respect to time as a function of m for a series of analyte or target molecule concentrations, as illustrated in FIG. 11b.

The coefficients $p_i$ of the exponential are then plotted as a function of the concentration $c_i$ and fitted by a straight line, which is illustrated in FIG. 11c and the equation of which is:

$$p = k_a \cdot c + k_d \qquad [\text{Math 23}]$$

This method may therefore make it possible to determine both $k_a$ and $k_d$. It should be noted that $K_A$ may also be determined in this way since $K_A = k_a/k_d$. This method does not generally make it possible to determine $k_d$ with precision. A fit by a decreasing exponential of m(t) after stopping the injection permits a more precise estimation of $k_d$.

Although described by means of a certain number of exemplary embodiments, the optical characterization method and device according to the present description comprise different variants, modifications and refinements which will be readily apparent to the person skilled in the art, given that these different variants, modifications and refinements form part of the scope of the invention as defined by the following claims.

REFERENCES

[Ref. 1] A. Arbouet et al. "Direct Measurement of the Single-Metal-Cluster Optical Absorption", Phys. Rev. Lett. (2004), 93, p. 127401.

[Ref. 2] B. J. Davis et al. "Robust determination of the anisotropic polarizability of nanoparticles using coherent confocal microscopy", Journal of the Optical Society of America A (2008), 25, pp. 2102-2113.

[Ref. 3] P. Van Duyne et al., "Single Silver Nanoparticles as Real-Time Optical Sensors with Zeptomole Sensitivity", Nano Lett. (2003), 3, 8, pp. 1057-1062.

[Ref. 4] J. Primot et al. "Extended Hartmann Test Based on the Pseudoguiding Property of a Hartmann Mask Completed by a Phase Chessboard", Applied Optics (2000), 39, p. 5715.

[Ref. 5] S. Khadir et al. "Optical Imaging and Characterization of Graphene and Other 2D Materials Using Quantitative Phase Microscopy", ACS Photonics (2017), 4, p. 3130.

[Ref. 6] S. Khadir et al. "Quantitative model of the image of a radiating dipole through a microscope", Journal of the Optical Society of America A, 36, (2019), pp. 478-484.

[Ref. 7] C. L. Holloway et al. "A discussion on the interpretation and characterization of metafilms/metasurfaces: The two-dimensional equivalent of metamaterials", Metamaterials (2009) 3, p. 100.

[Ref. 8] A. Mendoza-Galván et al. "Optical response of supported gold nanodisks", Optics Express (2011), 19, p. 12093.

[Ref. 9] R. Ogier et al. "Near-Complete Photo Spin Selectivity in a Metasurface of Anisotropic Plasmonic Antennas", Physical Review X 5 (2015), 5, p. 041019.

[Ref. 10] G. Lavigne et al. "Susceptibility Derivation and Experimental Demonstration of Refracting Metasurfaces Without Spurious Diffraction", IEEE Transactions on Antennas and Propagation (2018), 66, p. 1321.

The invention claimed is:

1. A method for the optical characterization of at least one particle present in a sample, comprising:
    illuminating said sample using a light beam, the sample being positioned in the object space of an optical system;
    acquiring at least one phase image and at least one intensity image of said at least one particle illuminated by the light beam, the acquisition being carried out in an analysis plane arranged in the image space of the optical system;
    calculating a combined image from said at least one phase image and said at least one intensity image, said combined image deriving from a normalized complex transmission of the sample, the real part of the normalized complex transmission of the sample or the imaginary part of the normalized complex transmission of the sample;
    summing points of said combined image over a given field of the combined image comprising an image of said at least one particle; and
    determining at least one optical property of said at least one particle from said sum, said at least one optical property comprising at least one of a complex dipolar polarizability, an effective absorption cross section, an effective scattering cross section, and an effective extinction cross section.

2. The method as claimed in claim 1, wherein the at least one intensity image and the at least one phase image are acquired simultaneously.

3. The method as claimed in claim 1, further comprising:
    varying a numerical aperture of the optical system to generate a plurality of numerical apertures; and
    acquiring a plurality of intensity images and phase images at said numerical apertures.

4. The method as claimed in claim 1, further comprising:
    varying the distance between the sample and the optical system to generate a plurality of distances; and
    acquiring a plurality of intensity images and phase images for said plurality of distances.

5. A method for characterization of the interaction of at least one target molecule with said at least one particle, comprising:
    optically characterizing said at least one particle using the method as claimed in claim 1 in order to determine at least one of said optical properties over time;
    characterizing the interaction with said at least one target molecule on the basis of a measurement of the variation of said at least one optical property over time.

6. The method as claimed in claim 5, wherein said at least one optical property comprises at least one of the real part, the argument, the norm, or the imaginary part of the complex polarizability of the at least one particle.

7. The method as claimed in claim 5, wherein said at least one particle is a metal particle and illuminating the sample comprises illuminating in a wavelength range comprising the plasmon resonance wavelength of the at least one particle.

8. The method as claimed in claim 5, wherein illuminating the sample comprises illuminating in a wavelength range comprising the Mie resonance wavelength of the at least one particle.

9. The method as claimed in claim 5, further comprising a prior step of calibration of said optical property as a function of the concentration of the at least one target molecule,
    wherein the calibration is carried out by measuring the optical property at a predetermined time for a series of samples with known concentrations of the target molecule, and
    wherein the characterization of the interaction with said at least one target molecule comprises a determination of the concentration of said target molecule in the sample, on the basis of said calibration.

10. The method as claimed in claim 5, further comprising:
    providing a plurality of samples comprising said at least one particle and said at least one target molecule, at a plurality of known concentrations;
    optically characterizing said at least one particle for each sample of said plurality of samples; and wherein:
    characterizing the interaction with said at least one target molecule comprises determining the affinity and/or association and/or disassociation constant of a target molecule with the at least one particle or with a molecule attached beforehand to the at least one particle,
    wherein said affinity and/or association and/or disassociation constant is determined on the basis of the variation of said optical property over time for said plurality of samples.

11. A device for the optical characterization of at least one particle present in a sample, comprising:
    a light source for generating a light beam for illumination of said sample;
    an optical system, the sample being positioned during operation in the object space of said optical system;
    an acquisition unit for acquisition of at least one phase image and at least one intensity image of said at least one particle illuminated by the light beam, the acquisition being carried out in an analysis plane arranged in the image space of said optical system; and
    a calculation unit configured for:
        calculating a combined image from said at least one phase image and said at least one intensity image, said combined image deriving from a normalized complex transmission of the sample, the real part of the normalized complex transmission of the sample or the imaginary part of the normalized complex transmission of the sample;
        summing points of said combined image over a given field of the combined image comprising an image of said at least one particle;
        determining at least one optical property of said at least one particle from said sum, said at least one optical property comprising at least one of a complex dipolar polarizability, an effective absorption cross section, an effective scattering cross section, and an effective extinction cross section.

12. The device as claimed in claim 11, wherein the acquisition unit comprises a multiwave lateral shearing interferometer.

13. The device as claimed in claim 11, wherein the optical system comprises a microscope objective.

14. The device as claimed in claim 11, wherein the optical system comprises a variable numerical aperture and said calculation unit is configured for determination of said at least one optical property from a plurality of phase images and intensity images which are acquired for a plurality of numerical apertures.

15. The device as claimed in claim 11, wherein said calculation unit is configured for determination of said at least one optical property from a plurality of phase images and intensity images which are acquired for a plurality of distances between the sample and the optical system.

16. A device for the characterization of the interaction of at least one target molecule with at least one particle present in a sample, comprising:
   a device for the optical characterization of said at least one particle as claimed in claim 12, which is configured to determine at least one optical property of said at least one particle over time; and
   wherein:
      said calculation unit is further configured for the characterization of the interaction with said at least one target molecule on the basis of a measurement of the variation of said at least one optical property over time.

17. The device as claimed in claim 16, wherein said at least one optical property comprises at least one of the real part, the argument, the norm, or the imaginary part of the complex polarizability of the at least one particle.

18. The device as claimed in claim 16, further comprising a microfluidic circuit for adding the at least one target molecule into the sample.

\* \* \* \* \*